United States Patent
Michellone et al.

[15] 3,706,478
[45] Dec. 19, 1972

[54] HYDRAULIC CIRCUITS

[72] Inventors: Giancarlo Michellone, Cambiano; Mario Palazzetti, Turin, both of Italy

[73] Assignee: Fiat Societa per Azioni, Turin, Italy

[22] Filed: Dec. 31, 1970

[21] Appl. No.: 103,080

[52] U.S. Cl. ............................ 303/10, 303/40
[51] Int. Cl. ................................ B60t 13/16
[58] Field of Search ............ 303/6 R, 10, 59, 61, 40; 251/50, 53

[56] References Cited

UNITED STATES PATENTS

| 3,588,192 | 6/1971 | Drutchas | 303/10 X |
| 2,318,610 | 5/1943 | Hyatt et al. | 303/10 X |
| 3,519,311 | 7/1970 | Holden | 303/10 |
| 3,176,467 | 4/1965 | Van House | 303/6 R |
| 1,207,801 | 12/1916 | Schmidt | 303/10 |
| 3,466,099 | 9/1969 | Schultz | 303/10 X |

*Primary Examiner*—Evon C. Blunk
*Assistant Examiner*—W. Scott Carson
*Attorney*—Sughrue, Rothwell, Mion, Zinn & Macpeak

[57] ABSTRACT

A hydraulic circuit suitable for a vehicle braking system is arranged so that a pump feeding the circuit is under load only when the circuit is actuated, as by braking. The pump outlet is connected to a flow restriction valve actuated by, for instance, a pedal, with a power cylinder such as a brake cylinder connected upstream of the valve.

2 Claims, 2 Drawing Figures

3,706,478

INVENTORS
GIANCARLO MICHELLONE
MARIO PALAZZETTI

BY  Sughrue, Rothwell, Mion,
     Zinn & Macpeak

ATTORNEYS

HYDRAULIC CIRCUITS

This invention relates to a hydraulic circuit that is particularly suitable for use in vehicle braking systems but is also useful in other fields such as machine tools.

Vehicle braking systems are known in which the pressure applied by the driver to the brake pedal is amplified by hydraulic means to supply a working pressure to the brake cylinder. Systems are also known in which a pump driven by the engine of the vehicle normally maintains a fluid under pressure in a pressure accumulator, the pressure in the accumulator being continuously available for application to the brake cylinder.

These systems require the pump to operate continuously under load, and a part of the circuit to be kept under pressure even during periods in which the pressure is not required. Consequently, the wear on the components of the circuit and the possibility of damage to the pump and its associated tubes or other conduits and to the accumulator do not depend on the duration of the periods in which the brake is applied but on the duration of use of the vehicle as a whole. It is therefore necessary to design the circuit correspondingly, and this increases costs.

The object of the invention is to provide a hydraulic circuit in which the wear and the risks of damage to the components are reduced by placing the circuit under pressure only at the moments when the pressure is being actively used. This leads to a reduction in costs of manufacture and maintenance.

A further object is to provide a circuit which, when used as a braking system, dispenses with the need for a servomechanism while allowing high pressure values to be built up in the brake cylinder.

The invention provides a hydraulic circuit comprising a constant-delivery pump adapted to be continuously driven, a reservoir, a conduit connecting an outlet of the pump to the reservoir, a conduit connecting an inlet of the pump to the reservoir, a variable flow restriction valve located in the tube between the pump outlet and the reservoir, the valve being normally open and being adapted to be actuated by hydralic pressure applied to a port of the valve, a hydraulic control cylinder connected by a conduit to the control port of the valve, means to actuate the control cylinder, and a hydraulic power cylinder connected by a conduit to a point on the conduit between the pump outlet and the valve.

Other object and advantages of the invention will be clear from the following description of a preferred embodiment with reference to the accompanying drawings, in which.

Figure 1:
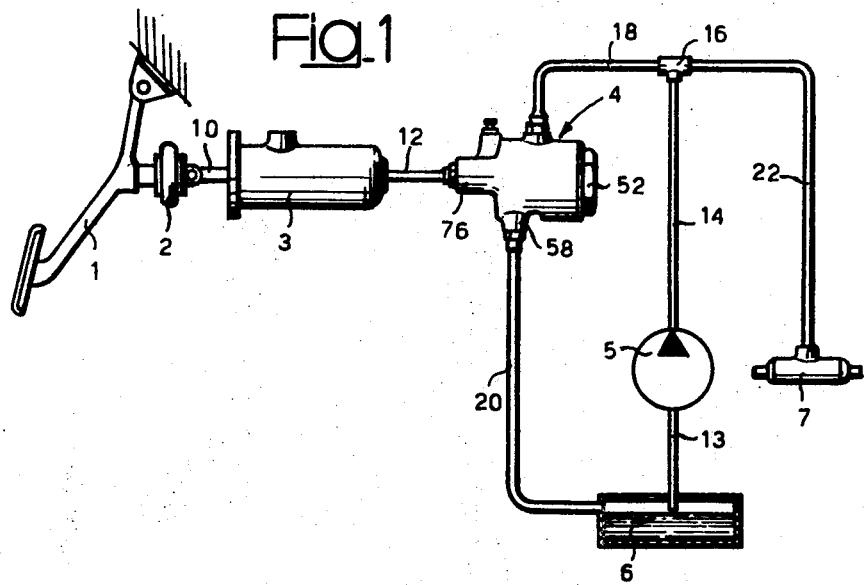
FIG. 1 is a diagrammatic illustration of a hydraulic circuit.

A hydraulic circuit used as a braking system for a vehicle or other machine is seen in FIG. 1. A brake pedal 1 acts, through a disc 2 of resilient material, on a linkage 10 projecting from a hydraulic control cylinder 3. This cylinder provides a control pressure that is applied through a conduit such as a tube 12 to a control port 76 of a variable flow restriction valve 4. Detailed construction of the valve 4 is described later.

Fluid is drawn from a reservoir 6 through a tube 13 into the inlet of a constant-delivery pump 5 which is driven at all times while an engine (not illustrated) of the vehicle or other machine is running. Fluid from an outlet of the pump 5 flows through a tube 14 to a T-joint 16 and thence through a tube 18 to an inlet port 56 of the valve 4. The valve 4 is normally open and fluid leaves the valve 4 through an outlet port 58 to return through a tube 20 to the reservoir 6.

A branch tube 22 also leads from the T-joint 16, and is connected to a hydraulic power cylinder 7 which, in the case of a vehicle, is a brake cylinder.

Under normal conditions the pedal 1 is not actuated and the control pressure in the tube 12 is substantially zero. The valve 4 permits free passage of fluid from the tube 18 to the tube 20. The pressure supplied to the power cylinder 7 through the tube 22 is therefore zero.

Figure 2:
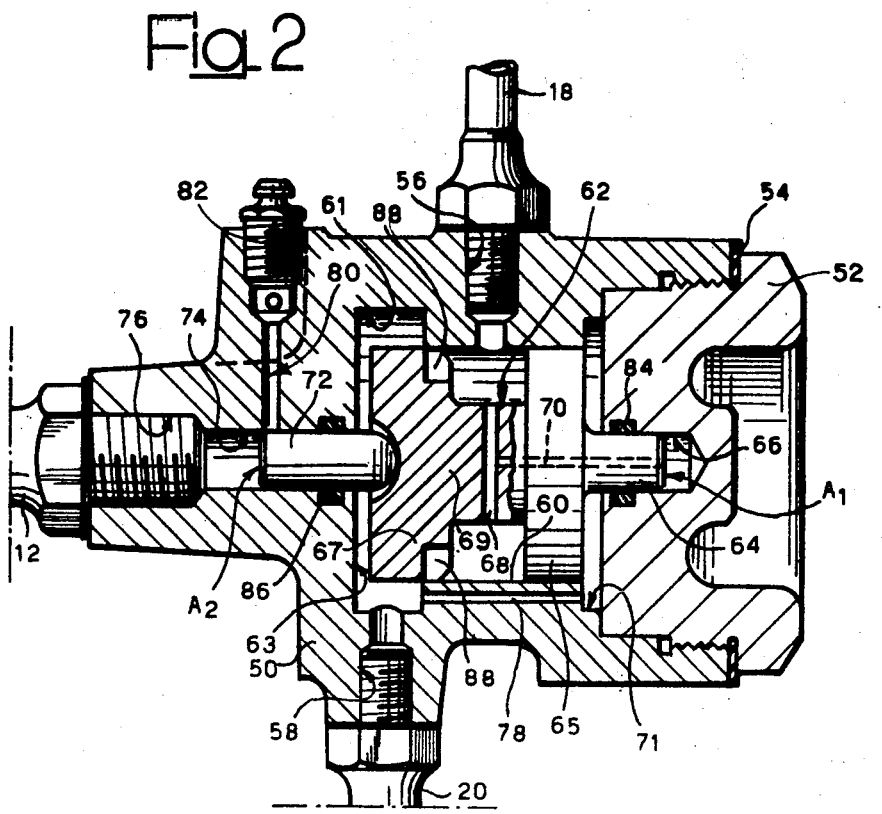
FIG. 2 is a longitudinal sectioned view through a flow restriction valve of the circuit of FIG. 1.

As seen in FIG. 2, the valve 4 comprises a body 50 having a cylindrical cavity 60 with a portion 61 of increased diameter at a closed end 63, and a portion 71 of similarly enlarged diameter at the opposite end, which is threaded. A plug 52 is screwed into the threaded end of the cavity 60. A seal 54 is interposed between the body 50 and the plug 52.

The inlet port 56 is formed radially in the body 50 and opens into the cavity portion 60. Fluid enters the port 56 from the pump 5 through the tube 18, passing through the cavity 60 and leaving the valve through the outlet port 58 which is also formed radially, being opposite and axially displaced from the port 56 in the portion 61 of enlarged diameter. Fluid discharged through the port 58 flows through the tube 20 to the reservoir 6.

A spool 62, shown partly in section, slides in the cavity 60. It has end flanges 65, 67 connected by a portion 69 of reduced diameter. A splined portion 88 is located between the portion 69 and the flange 67. A longitudinal projection 64 on the flange 65 is slidable in a blind bore 66 formed in the plug 52, sealed by an O-ring 84. The bore 66 is connected to the cavity 60 through perpendicular passages 68, 70 formed between the flanges 65, 67 of the spool 62.

The control port 76 is formed axially in the body 50, and contains a plunger 72 sealed by an O-ring 86 and slidable in a bore 74 forming an extension of the port 76 to bear against the end of the flange 67 of the spool 62.

A pressure equalization passage 78 is formed longitudinally in the body 50 to connect the cavity portions of enlarged diameter 61 and 71. A vent hole 80 for bleeding the control circuit leads radially from the bore 74 to the atmosphere, being closed by a screw plug 82.

OPERATION OF THE CIRCUIT

When pressure is applied to the pedal 1, the resilient disc 2 is compressed, absorbing in effect a portion of the pedal stroke. A proportion of the pedal force is transmitted to the linkage 10 and through it to the control cylinder 3. Fluid flows under pressure from the cylinder 3 through the tube 12 into the control port 76 of the valve 4, pushing the plunger 72 against the spool 62.

Until this stage, fluid from the pump 5 has been passing freely through the valve 4. The spool 62 has been free in the composite cavity 60, 61, 66, 71 because the fluid surrounding the spool 62 has been at constant pressure, substantially zero. The dynamic flow of the fluid through the valve, however, has held the spool against the end wall 63.

When the pedal force compels the plunger 72 to move the spool 62 away from the end wall 63, a restriction takes place in the flow of fluid through the valve since there is a reduction in the cross-sectional area available for this flow between the flange 67, which has a radial clearance in the cavity portion 61, and the shoulder formed at the junction of the cavity portions 60,61. Pressure rises in the space between the spool flanges 65,67. It is equalized on both flanges 65, 67 by the equalizing passage 78. This pressure also exists in the passages 68, 70 and in the bore 66. Pressure on the projection 64 in the bore 66 opposes further movement of the plunger 72 under the pedal force, and eventually a condition of equilibrium is reached. The pressure build-up in the tubes 14, 18 upstream of the inlet port 56 causes fluid under pressure to actuate the power cylinder 7 through the tube 22.

Neglecting friction, if $A_1$ is the cross-sectional area of the projection 64 and $A_2$ is the cross-sectional area of the plunger 72, $P_1$ the pressure in the bore 66 and $P_2$ that in the bore 74, then the spool 62 is in equilibrium when:

$$P_1 A_1 = P_2 A_2.$$

It is clear that by making $A_1$ smaller than $A_2$ it is possible to operate the valve 4 with a control pressure from the cylinder 3 which is less than the pressure in the port 56 and therefore in the pump 5 and power cylinder 7.

Since the volume of fluid which the control cylinder 3 has to supply to the valve 4 is extremely small (the stroke of the plunger 72 may be of the order of a millimeter); the dimensions of the control cylinder 3 and more particularly its diameter can be made small. Since the stroke of the plunger 72 is small, the valve 4 can also be compact. The valve can be located anywhere in a vehicle and even incorporated in the pump 5 if need be.

The purpose of the resilient disc 2 is to make the stroke of the brake pedal 1 somewhat longer than that of the plunger 72 so that it is possible to regulate the action of the power cylinder 7 very precisely.

What we claim is:

1. A hydraulic circuit comprising a constant delivery pump adapted to be continuously driven, a reservoir, a conduit connecting an inlet of said pump to said reservoir, a variable flow restriction valve located in a conduit between the pump outlet and the reservoir, said valve having a control port, a hydraulic control cylinder connected by a conduit to said control port, means for actuating said control cylinder and a hydraulic power cylinder connected by a conduit to a point on the conduit between the pump outlet and said valve; said valve comprising a cavitated body having an inlet port and an outlet port, a spool movable in said cavity, said spool and cavity having surfaces which define a normally open fluid passage through said valve, a bore communicating with said control port and having a plunger therein bearing on said spool with a force dependent on the control pressure applied to said control port, said spool being movable under said control pressure to a variable position in which the cross section of the passage through the valve is restricted; said spool having two end flanges sealingly slidable in said cavity of the valve and a portion of reduced diameter formed between the flanges, the space between the flanges being in constant communication with the inlet port, the cavity in the valve having a portion of enlarged cross section in which the first of the flanges of the spool has radial clearance, the outlet port communicating with said portion of enlarged diameter, and a longitudinal projection on the second flange slidably and sealingly disposed in a bore in said valve, said bore communicating with the inlet port, the projection providing a surface on which pressure may act to oppose the spool movement under the action of said plunger.

2. The circuit of claim 1 in which the bore in the valve communicates with the inlet port through a passage formed in the spool.

* * * * *

UNITED STATES PATENT OFFICE
CERTIFICATE OF CORRECTION

Patent No. 3,706,478                    Dated December 19, 1972

Inventor(s) Giancarlo Michellone et al

It is certified that error appears in the above-identified patent and that said Letters Patent are hereby corrected as shown below:

In The Heading:

The Priority Date was omitted. Should Read:

--Italy            January 14, 1970.............67090-A/70--

Signed and sealed this 3rd day of July 1973.

(SEAL)
Attest:

EDWARD M. FLETCHER, JR.                Rene Tegtmeyer
Attesting Officer                      Acting Commissioner of Patents